United States Patent
Ferran

(10) Patent No.: US 9,719,877 B2
(45) Date of Patent: *Aug. 1, 2017

(54) METHOD AND APPARATUS FOR DAMPING DIAPHRAGM VIBRATION IN CAPACITANCE DIAPHRAGM GAUGES

(71) Applicant: Ferran Technology, Inc., San Diego, CA (US)

(72) Inventor: Robert J. Ferran, San Diego, CA (US)

(73) Assignee: Ferran Technology, Inc., San Diego, CA (US)

( * ) Notice: Subject to any disclaimer, the term of this patent is extended or adjusted under 35 U.S.C. 154(b) by 307 days.

This patent is subject to a terminal disclaimer.

(21) Appl. No.: 14/634,806

(22) Filed: Feb. 28, 2015

(65) Prior Publication Data

US 2015/0185100 A1    Jul. 2, 2015

Related U.S. Application Data

(63) Continuation of application No. 14/106,700, filed on Dec. 13, 2013, now Pat. No. 8,997,575.

(60) Provisional application No. 61/764,530, filed on Feb. 13, 2013.

(51) Int. Cl.
  *G01L 9/12*   (2006.01)
  *G01L 9/00*   (2006.01)
  *G01L 27/00*  (2006.01)

(52) U.S. Cl.
  CPC .......... *G01L 9/0072* (2013.01); *G01L 9/0016* (2013.01); *G01L 9/12* (2013.01); *G01L 27/005* (2013.01)

(58) Field of Classification Search
  None
  See application file for complete search history.

(56) References Cited

U.S. PATENT DOCUMENTS

| | | |
|---|---|---|
| 2,667,786 A | 2/1954 | Spaulding |
| 4,823,603 A | 4/1989 | Ferran et al. |
| 5,396,803 A | 3/1995 | Ferran |
| 5,515,711 A | 5/1996 | Hinkle |

(Continued)

OTHER PUBLICATIONS

Thomas, Shane, Authorized Officer, Notification of Transmittal of the International Search Report and the Written Opinion of the International Searching Authority, May 27, 2014, (1 page), with International Search Report (2 pages) and Written Opinion of the International Searching Authority (6 pages), 9 pages total, for PCT/US2014/016148.

*Primary Examiner* — Andre Allen
(74) *Attorney, Agent, or Firm* — Patterson Intellectual Property Law, P.C.; Jerry Turner Sewell

(57) ABSTRACT

A system and method mitigate the effects of these external vibrations on a capacitance diaphragm gauge by sensing the motion of the diaphragm at the first natural frequency of the diaphragm of the CDG. The presence of the natural frequency signals superimposed on the pressure signal is determined by sensing variations in the output of a sensor at or near the known natural frequency of the diaphragm and filtering that known low frequency from the output. The filtered signal is used in a feedback circuit to impose electrostatic forces on the diaphragm. The imposed electrostatic forces oppose the motion created by the external vibration to suppress the effects of the vibration on the pressure measured by the CDG.

1 Claim, 3 Drawing Sheets

(56) References Cited

U.S. PATENT DOCUMENTS

| | | |
|---|---|---|
| 6,734,659 B1 | 5/2004 | Fortner |
| 6,837,112 B2 | 1/2005 | Ferran et al. |
| 7,308,830 B2 | 12/2007 | Harasyn et al. |
| 7,841,239 B2 | 11/2010 | Miyashita |
| 8,760,221 B1 * | 6/2014 | Ferran .................. H03K 5/1252 327/551 |
| 8,901,993 B1 * | 12/2014 | Ferran .................. H03K 5/1252 327/551 |
| 8,997,575 B2 * | 4/2015 | Ferran ....................... G01L 9/12 73/724 |
| 2010/0198545 A1 | 8/2010 | Berg et al. |
| 2011/0056302 A1 | 3/2011 | Lutz |
| 2011/0239773 A1 | 10/2011 | Koslinski et al. |
| 2011/0271764 A1 | 11/2011 | Lee |
| 2013/0233086 A1 | 9/2013 | Besling et al. |
| 2014/0202254 A1 | 7/2014 | Ferran et al. |
| 2014/0208822 A1 | 7/2014 | Ferran et al. |
| 2014/0222362 A1 | 8/2014 | Ferran et al. |
| 2014/0222363 A1 | 8/2014 | Ferran et al. |
| 2015/0185105 A1 * | 7/2015 | Ferran .................. G01L 27/002 73/1.58 |

* cited by examiner

METHOD AND APPARATUS FOR DAMPING DIAPHRAGM VIBRATION IN CAPACITANCE DIAPHRAGM GAUGES

RELATED APPLICATIONS

The present application is a continuation of U.S. patent application Ser. No. 14/106,700 filed on Dec. 13, 2013, which claims the benefit of priority under 35 USC §119(e) to U.S. Provisional Application No. 61/764,530 filed on Feb. 13, 2013, which is incorporated by reference herein.

BACKGROUND OF THE INVENTION

Field of the Invention

The present invention is in the field of capacitance diaphragm gauges which measure pressure based on the deflection of a diaphragm.

Description of the Related Art

Absolute capacitance diaphragm gauges (CDGs) measure pressure by sensing the capacitance change associated with deflection of a diaphragm whereby one side of the diaphragm ("the Px side") is exposed to the pressure to be measured (Px) and the other side of the diaphragm is exposed to a sealed reference vacuum cavity in which an ultrahigh vacuum (e.g., less than $10^{-9}$ Torr) has been created prior to the sealing of the reference cavity.

The CDG measures capacitance between a diaphragm and one or more fixed electrodes housed in the reference vacuum cavity. When the pressure on the Px side of the diaphragm is higher than the pressure in the reference vacuum cavity, the diaphragm deflects in the direction of the fixed electrode (or electrodes), which increases the measured capacitance. As the pressure on the Px side of the diaphragm decreases, the pressure differential across the diaphragm diminishes and the diaphragm moves away from the fixed electrode (or electrodes) in the reference vacuum cavity, which reduces the measured capacitance.

As the pressure on the Px side of the diaphragm approaches the pressure in the reference vacuum cavity, the pressure differential across the diaphragm becomes sufficiently small as to be considered as the "zero point" for the CDG. This fixed zero point is established during the calibration of the CDG and is used as a reference in subsequent pressure measurements.

CDGs are commonly used to the measure pressure in vacuum chambers in which thin or thick films of material are deposited on a substrate. One common example of usage is to measure pressure during the deposition of materials onto the surface of silicon wafers during fabrication of semiconductor devices.

The accuracy of the measurement of pressure by a CDG can be negatively impacted by several factors, one of which is the vibration or oscillation of the CDG diaphragm at its natural frequency or its harmonics. This occurs when external forces cause the case of the CDG to be accelerated at various frequencies at or near the natural frequency of the diaphragm. The deflections of the diaphragm caused by resonant vibrations are detectable as changes in pressure which are not distinguishable from actual pressure changes.

SUMMARY OF THE INVENTION

A need exists to mitigate the effects of external vibrations to reduce or eliminate the pressure measurement errors caused by the vibration-induced deflection of the diaphragm. The system disclosed and claimed herein is responsive to the need.

In order to mitigate the negative effects of these external vibrations, the system and method disclosed herein sense the motion of the diaphragm at the first natural frequency of the diaphragm of a CDG. Higher harmonics of the natural frequency occur less often, have smaller amplitudes, and contribute less to the overall signal because the motions of various portions of the diaphragm cancel each other. The presence of the natural frequency signals superimposed on the pressure signal is determined by sensing variations in the output of a sensor at or near the known natural frequency of the diaphragm and filtering that known low frequency from the output. The filtered signal is processed and used in a feedback circuit to impose electrostatic forces on the diaphragm. The imposed electrostatic forces oppose the motion created by the vibration to suppress the effects of the vibration on the pressure measured by the CDG.

An aspect of embodiments disclosed herein is a method for suppressing the effects of vibration on a capacitance diaphragm gauge (CDG) that generates an output signal having an amplitude that varies in accordance with pressure applied to the CDG. The method further processes the output signal to detect changes in amplitude of at least one frequency corresponding to a vibration frequency to generate a feedback signal responsive to the amplitude of the at least one frequency. The method applies the feedback signal to the diaphragm and the fixed electrode to cause the diaphragm to be deflected counter to the deflection caused by vibration to thereby suppress the deflection caused by vibration. In preferred embodiments, the output signal is processed by applying the output signal to a bandpass filter having a band centered generally at a resonant frequency of the diaphragm of the CDG. The bandpass filter generates a band-limited signal responsive to the changes in amplitude of the output signal caused by vibrations. The band-limited signal is applied to a rectifier to generate a rectified signal having an amplitude responsive to the magnitude of the vibrations. The rectified signal is applied to a feedback control circuit to generate the feedback signal, which has an amplitude selected to damp the movement of the diaphragm caused by vibration.

Another aspect of embodiments disclosed herein is a vibration detection system for a capacitance diaphragm gauge (CDG). The CDG includes a diaphragm and at least one fixed electrode wherein the capacitance between the diaphragm and the at least one fixed electrode is responsive to a pressure applied to the CDG that deflects the diaphragm with respect to the at least one fixed electrode. The CDG includes a signal source that generates a high frequency voltage that is applied between the diaphragm and the fixed electrode and includes a pressure measuring circuit that receives and demodulates a high frequency signal from the diaphragm and the fixed electrode to detect changes in amplitude caused by capacitance changes resulting from pressure changes applied to the CDG. The vibration detection system comprises a bandpass filter that receives the high frequency signal from the diaphragm and the fixed electrode and that passes modulation components of the high frequency signal at a range of frequencies selected to encompass a resonant frequency of vibration of the diaphragm. The vibration detection system further includes a rectifier that generates a rectified output signal having amplitudes responsive to the amplitudes of the components of the high frequency signal passed by the bandpass filter. The vibration detection system further includes a feedback control circuit that receives the rectified output signal and that generates a feedback signal applied between the diaphragm and the fixed electrode to apply an electrostatic force to the diaphragm. The feedback signal is responsive to the rectified output signal to apply the electrostatic force to offset movement of the diaphragm caused by vibration. In preferred embodiments, the feedback signal comprises a time-varying DC voltage applied between the diaphragm and the at least one fixed electrode to cause the diaphragm to deflect toward the at least one fixed electrode to offset the deflection of the diaphragm away from the fixed electrode caused by vibration.

BRIEF DESCRIPTION OF THE DRAWINGS

Embodiments in accordance with aspects of the present invention are described below in connection with the attached drawings in which.

DETAILED DESCRIPTION OF PREFERRED EMBODIMENTS

The improvements to capacitance diaphragms are disclosed herein with respect to exemplary embodiments of a system and a method. The embodiments are disclosed for illustration of the system and the method and are not limiting except as defined in the appended claims. Although the following description is directed to a particular embodiment of a capacitance diaphragm gauge, it should be understood that the disclosed system and method can be applied to other embodiments of capacitance diaphragm gauges.

Figure 1:
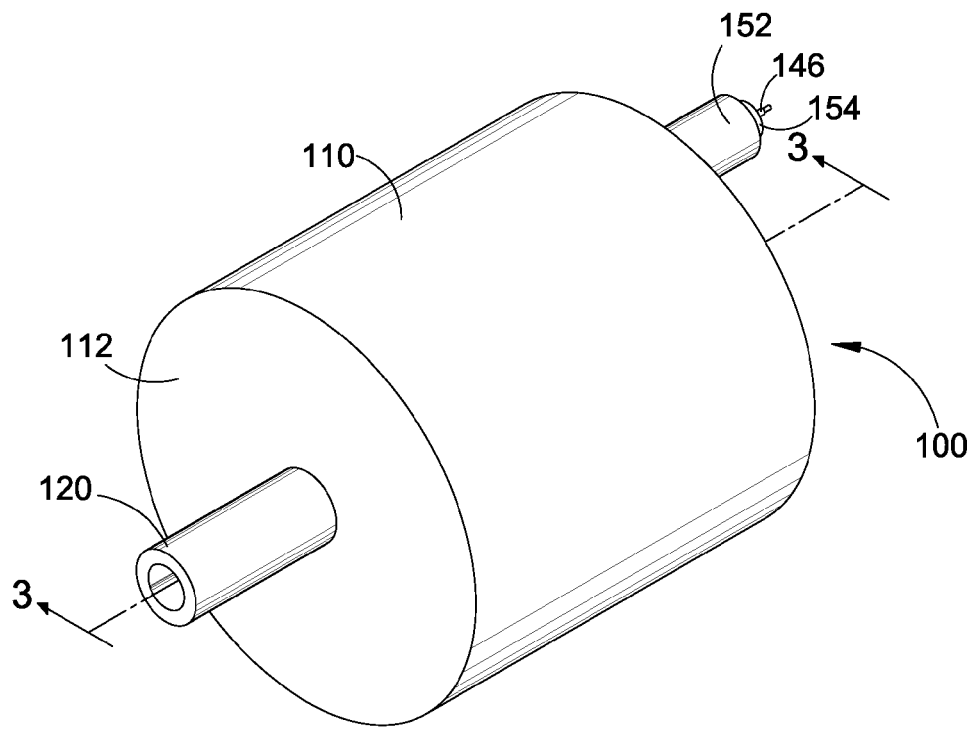
FIG. 1 illustrates a front perspective view of an exemplary capacitance diaphragm gauge (CDG), which is installable into a pneumatic system (not shown) to measure the pressure within the system.
Figure 2:
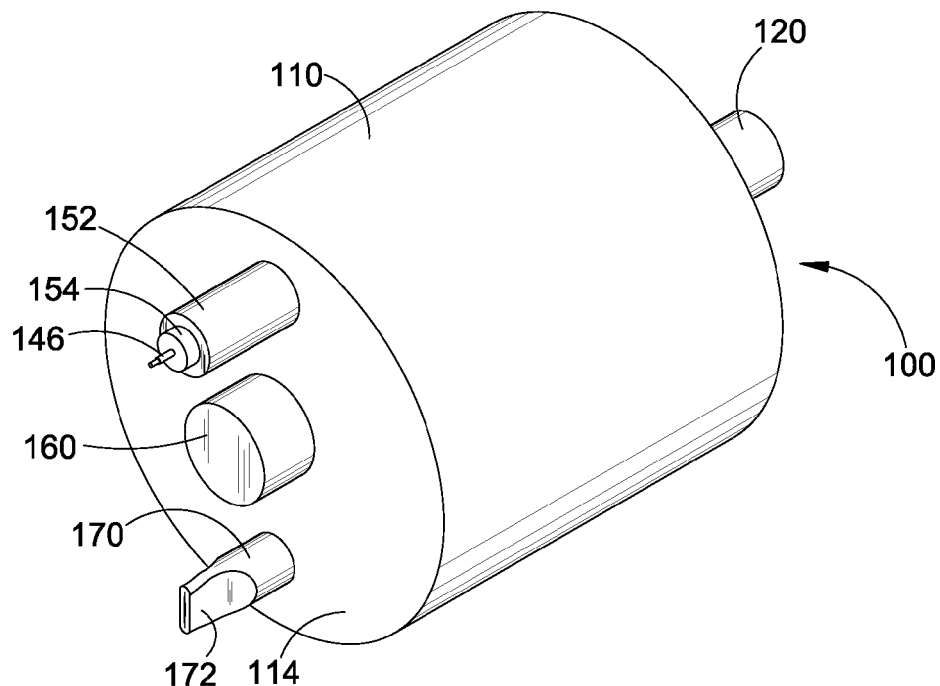
FIG. 2 illustrates a rear perspective view of the CDG of FIG. 1 which is rotated 180° from the view in FIG. 1.
Figure 3:
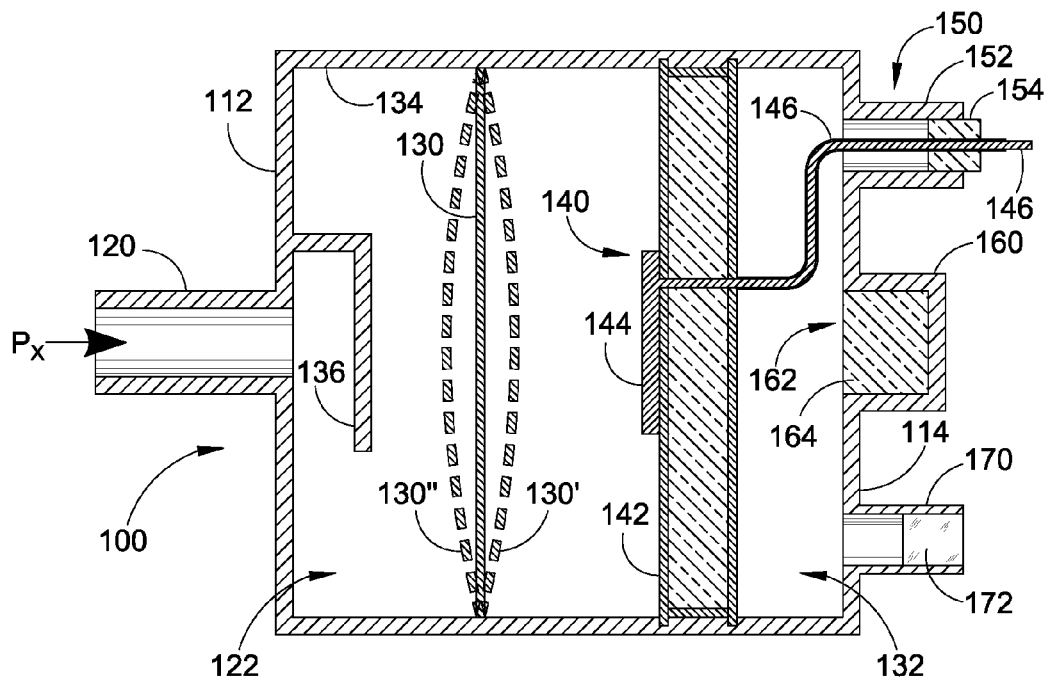
FIG. 3 illustrates a cross-sectional view of the CDG taken along the line 3-3 in FIG. 1, wherein the diaphragm appears undeflected in solid lines and appears in first and second deflected positions in dashed lines.

FIG. 1 illustrates a front perspective view of an exemplary capacitance diaphragm gauge (CDG) 100, which is installable into a pneumatic system (not shown) to measure the pressure within the system. In particular, the CDG is used to measure very low pressures resulting from evacuation of the pneumatic system. FIG. 2 illustrates a rear perspective view of the CDG of FIG. 1 which is rotated 180° from the view in FIG. 1. FIG. 3 illustrates a cross-sectional view of the CDG taken along the line 3-3 in FIG. 1.

In the illustrated embodiment, the CDG 100 comprises a hollow, generally cylindrical body structure 110, which extends between a first end surface 112 (FIG. 1) and a second end surface 114 (FIG. 2). A first cylindrical tube 120 extends from the first end surface. The first cylindrical tube provides pneumatic access to a first inner cavity 122 (FIG. 3) of the CDG. The first cylindrical tube is connectable to the pneumatic system (not shown) to allow the pressure of the system to be applied to the first inner cavity.

As shown in FIG. 2, a diaphragm 130 within the cylindrical body structure 110 separates the first inner cavity 122 from a second inner cavity 132. The diaphragm is sealed around its peripheral edges with respect to an inner surface 134 of the cylindrical body structure so that the first inner cavity is pneumatically isolated from the second inner cavity by the diaphragm. The diaphragm is also electrically connected to the cylindrical body structure, which is electrically connected to a ground reference, as discussed below.

In certain embodiments, the diaphragm 130 comprises Inconel 750 or another suitable material. In certain embodiments, the diaphragm has a thickness that can range from approximately 0.001 inch (0.025 mm) to approximately 0.015 inch (0.38 mm). The first inner cavity 122 also includes a baffle 136 that is positioned between the diaphragm and the first cylindrical tube 120. The baffle reduces the deposition of contaminants onto the surface of the diaphragm that faces the first inner cavity.

An electrode assembly 140 is positioned within the second inner cavity 132 between the diaphragm 130 and the second end surface 114. The electrode assembly comprises a mounting structure 142, which is secured to the inner surface 134 of the cylindrical body structure 110. The mounting structure of the electrode assembly is not sealed around the peripheral edges. Accordingly, both sides of the electrode assembly are at the same pressure within the second inner cavity. At least one electrode 144 is mounted on one side of the electrode assembly mounting structure. In particular, the electrode is mounted on the side of the mounting structure that faces the diaphragm. The electrode is electrically connected through the mounting structure. A conductor 146 extends from the mounting structure to a port 150 that extends through the second end surface 114 of the cylindrical body structure 110. The port 150 includes a second cylindrical tube 152 that extends outwardly from the second end surface. The conductor extends beyond the end of the second cylindrical tube. The conductor extends through a plug 154 that hermetically seals the second cylindrical tube around the conductor.

Although described herein with respect to one electrode on the electrode assembly, one skilled in the art will appreciate that the electrode assembly may include more than one electrode. See, for example, U.S. Pat. No. 4,823,603 to Ferran et al., which discloses two concentric fixed electrodes. U.S. Pat. No. 4,823,603 is incorporated herein by reference.

In the illustrated embodiment, a central portion 160 of the second end surface 114 extends outwardly to form an extended cavity portion 162 of the second inner cavity 132. The extended portion of the second inner cavity houses a getter 164. The getter functions in a conventional manner to remove small amounts of gas that may be released by the inner surface of the second inner cavity.

A third cylindrical tube 170 extends from the second end surface 114 of the cylindrical body structure 110. Initially, the entire length of the third cylindrical tube is uniformly cylindrical. The third cylindrical tube is connected to a vacuum evacuation system (not shown) to evacuate the gases from the second inner cavity 132 to create a desired low pressure within the second inner cavity. After the evacuation process is completed, an end portion 172 of the third cylindrical tube is crimped as shown in FIG. 1 to seal the second inner cavity to maintain the evacuated condition of the second inner cavity.

As illustrated in the cross-sectional view of FIG. 3, the diaphragm 130 is a thin metallic plate that separates the first inner cavity 122 from the second inner cavity 132. As discussed above, the second inner cavity is evacuated so that the absolute pressure within the second inner cavity is very low (e.g., approximately $10^{-9}$ Torr). The pressure within the first inner cavity is determined by the pressure Px of the system (not shown) to which the first cylindrical tube 120 is connected. When the pressure within the first inner cavity is substantially equal to the pressure within the second inner cavity, the diaphragm will not be deflected and will maintain the substantially flat shape shown by the solid cross-hatched profile (labeled as 130 in FIG. 3). If the pressure Px on the system side of the diaphragm (i.e., the pressure in the first inner cavity) exceeds the pressure in the second inner cavity, the center of the diaphragm will be deflected toward the second inner cavity and the diaphragm will bow into the second inner cavity as illustrated by a first dashed cross-hatched profile 130' in FIG. 3. If the pressure Px on the system side of the diaphragm is less than the pressure in the second inner cavity, the center of the diaphragm will be deflected toward to the first inner cavity and the diaphragm will bow into the first inner cavity as illustrated by a second dashed cross-hatched profile 130" in FIG. 3. In each case, the amount of the deflection will be determined by the pressure differential between the first and second inner cavities. The amount of deflection is also determined in part by the material properties of the diaphragm (e.g., the stiffness of the diaphragm).

As is well known in the art, the diaphragm 130 forms a first, movable plate of a variable capacitor. The electrode 144 on the electrode support structure 142 forms a second, fixed plate of the variable capacitor. When the diaphragm 130 is in the undeflected initial state, the capacitance of the variable capacitor has a first (initial) value determined by the initial distance between the diaphragm and the electrode. When the pressure Px increases, the diaphragm is deflected toward the second inner cavity and thus toward the fixed electrode as illustrated by the first dashed cross-hatched profile 130'. The deflection reduces the distance between the diaphragm and the electrode, which increases the capacitance of the variable capacitor. When the pressure Px decreases, the diaphragm is deflected toward the first inner cavity and thus away from the fixed electrode as illustrated by the second dashed cross-hatched profile 130". The deflection increases the distance between the diaphragm and the electrode, which decreases the capacitance of the variable capacitor. As discussed below, the capacitance is monitored and the increases and decreases in capacitance are used to determine corresponding increases and decreases in the system pressure Px. The CDG is initially calibrated by monitoring the changes in capacitance as a plurality of known values of the pressure Px are applied to the CDG.

Figure 4:
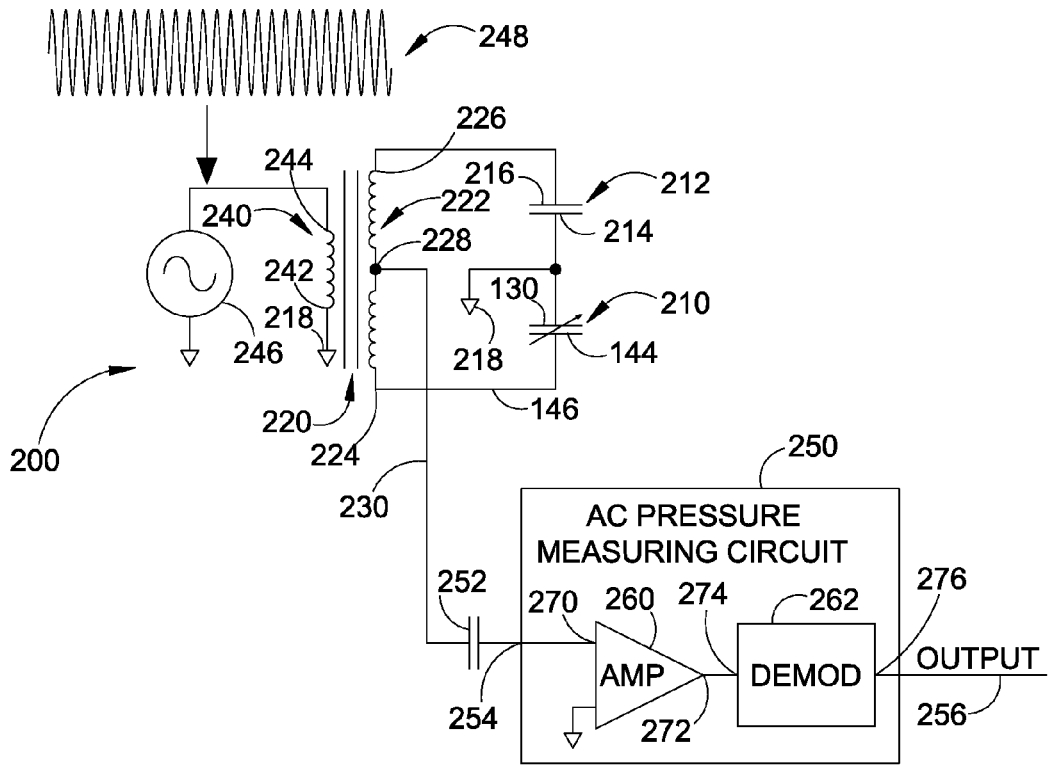
FIG. 4 illustrates a basic pressure monitoring system that monitors that the capacitance of the variable capacitor formed by the diaphragm and the fixed electrode of FIG. 3 to determine the deflection of the capacitor and thereby determine the pressure applied to the diaphragm.

FIG. 4 illustrates a simplified exemplary system 200 for monitoring the capacitance of the variable capacitor formed by the diaphragm 130 and the fixed electrode 144 of FIG. 3. The system comprises a first capacitor 210 and a second capacitor 212. The first capacitor comprises the variable capacitor formed by the diaphragm and the fixed electrode. Accordingly, a first electrode (the diaphragm) of the first capacitor is identified with the reference number 130, and a second electrode (the fixed electrode) of the first capacitor is identified with the reference number 144. The second capacitor is a conventional fixed capacitor. The second capacitor has a first electrode 214 and a second electrode 216.

The first electrode 130 of the first capacitor 210 and the first electrode 214 of the second capacitor 212 are connected to a ground reference 218. The second electrode 144 of the first capacitor is connected to a first terminal 224 of a center-tapped output (secondary) winding 222 of a transformer 220. The second electrode 216 of the second capacitor is connected to a second terminal 226 of the output winding of the transformer. A center-tap terminal 228 of the output winding of the transformer provides a signal output on a line 230.

In the illustrated embodiment, the first electrode (diaphragm) 130 of the first (variable) capacitor 210 is mechanically and electrically connected to the cylindrical body structure 110. The cylindrical body structure is electrically connected to the ground reference 218 when installed in the system having the pressure to be measured, thus providing the electrical connection of the diaphragm to the ground reference. The second electrode 144 of the first (variable) capacitor is connected to the second terminal of the transformer via the conductor 146 of FIG. 3.

In the illustrated embodiment, the capacitance of the second capacitor 212 is fixed. The capacitance of the second (fixed) capacitor is selected to be approximately equal to the initial capacitance between the diaphragm 130 and the fixed electrode 144 (e.g., the initial capacitance of the first (variable) capacitor 210) when the system pressure Px in the first inner cavity 122 is approximately equal to the pressure in the second inner cavity 132 as discussed above with respect to FIG. 3.

The transformer 220 has an input (primary) winding 240 having a first terminal 242 and a second terminal 244. The first terminal is connected to the ground reference 218. The second terminal is connected to a high frequency signal source 246 operating, for example, at a frequency of approximately 50 kilohertz as represented by an AC waveform 248.

The electrical conductor 230 connects the center tap 228 of the output winding 222 of the transformer 220 to an input 254 of an AC pressure measuring circuit 250 via an AC coupling capacitor 252. The AC pressure measuring circuit provides an output signal (OUTPUT) on an output signal line 256.

In the illustrated embodiment, the AC pressure measuring circuit 250 comprises an amplifier 260 and a demodulator 262. The signal on the center tap 228 of the output winding 222 of the transformer 220 is applied to an input 270 of the amplifier via the AC coupling capacitor 252. The amplifier preferably has a very high input impedance so that substantially zero current flows into the input of the amplifier. An output 272 of the amplifier provides an amplified output signal to an input 274 of the demodulator. An output 276 of the demodulator provides the output signal on the output signal line 256. The output signal is responsive to the variations in the capacitance of the first (variable) capacitor 210. Accordingly, the output signal varies in response to changes in the system pressure Px.

The signal generated by the high frequency signal source 250 is applied to the input (primary) winding 240 of the transformer 220. The applied signal is coupled to the secondary winding 222 and induces a high frequency voltage across the secondary winding. The induced voltage is applied across the series connection of the first (variable) capacitor 210 and the second (fixed) capacitor 212. The voltage across each capacitor is inversely proportional to the respective capacitance of the capacitor. Since the capacitance of the second (fixed) capacitor is substantially constant, the voltage across the first (variable) capacitor varies in accordance with the deflection of the diaphragm 130 caused by differential pressure across the diaphragm between the first inner cavity 122 and the second inner cavity 132 of the CDG 100. Because one electrode of each of each capacitor is electrically connected to the ground reference 218, a difference in the voltages across the two capacitors appears as a voltage differential across the output winding between the first input terminal 224 and the second input terminal 226 of the output winding of the transformer.

The voltage differential across the output winding 222 of the transformer 220 causes a voltage to appear on the center tap 228 of the output winding that is referenced to the ground reference 218 and that is proportional to the differences in the capacitance between the first (variable) capacitor 210 and the second (fixed) capacitor 212.

The voltage on the center tap 228 of the output winding 222 of the transformer 220 is applied via the conductor 230 and the AC coupling capacitor 252 to the input 270 of the amplifier 260. The amplifier amplifies the center tap voltage and provides the amplified signal as an output signal on the output 272. The output signal from the amplifier is a time-varying signal at the frequency of the signal source 250 with an amplitude that is proportional to the difference in capacitance of the first (variable) capacitor 210, which varies in response to changes in the pressure differential across the diaphragm 130. Accordingly, the amplitude of the time-varying signal output of the amplifier changes in response to changes in the pressure differential across the diaphragm.

The time-varying signal generated by the amplifier 260 is demodulated by the demodulator 262 in a conventional manner to provide the output signal on the output signal line 256 having a DC voltage level corresponding to the pressure differential across the diaphragm 130. The AC pressure measuring circuit is calibrated to equate the variations in the AC voltage to the absolute pressure (Px) applied to the diaphragm. In one embodiment, the demodulator comprises a synchronous demodulator known to the art.

As discussed above, when the CDG 100 is installed in a system subject to external vibration, the diaphragm 130 may also vibrate. If the external vibration occurs at a frequency that is close to the resonant frequency of the diaphragm, the movement of the diaphragm in response to the external vibration may be sufficient to be detectable as a change in capacitance. The change in capacitance may cause the pressure measurements described above to be sufficiently erroneous to affect the proper operation of the system in which the CDG is installed.

Figure 5:
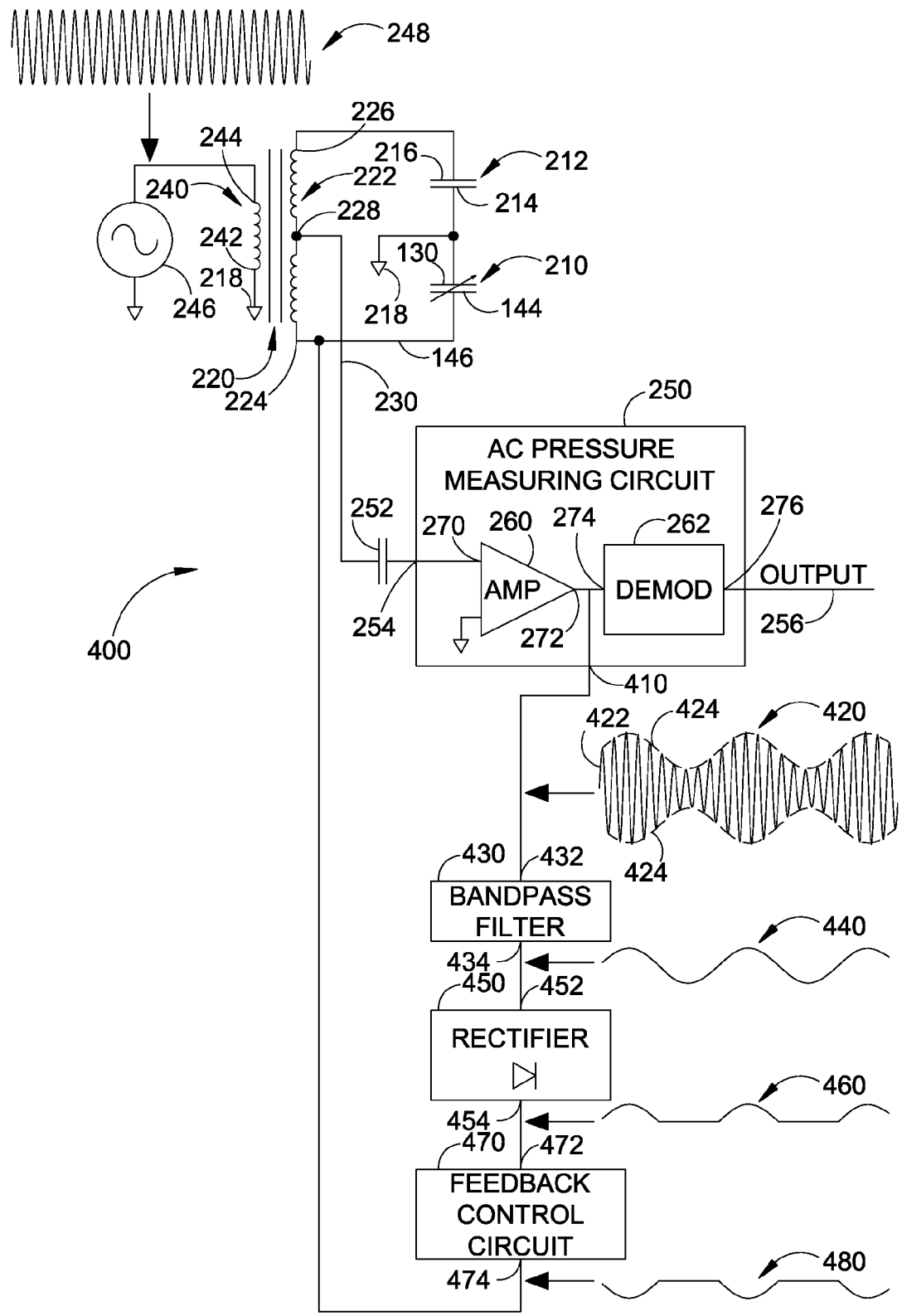
FIG. 5 illustrates an improved pressure monitoring system that compensates for the effects of vibration on the diaphragm of the CDG.

FIG. 5 illustrates an improved pressure monitoring system 400 that operates to reduce or eliminate the effects of vibration on the measured output signal from the CDG 100. The improved measurement system of FIG. 5 includes elements that are described above with respect to the system illustrated in FIG. 4. Accordingly, like elements are identified with reference numbers corresponding to the reference numbers in FIG. 4. The elements of the measurement system in FIG. 5 up to and including the AC pressure measuring circuit 250 are similar to the corresponding components in the previously described measuring system and are not described again in detail.

The AC pressure measuring circuit 250 in the system 400 of FIG. 5 operates as described above to measure the AC voltage developed between the center tap 228 of the secondary winding 222 and the common ground 218 and to generate a DC voltage on the output signal line 256 that is responsive to the changes in capacitance resulting from the deflection of the diaphragm 130 caused by the pressure (Px) applied to the diaphragm. As further illustrated in FIG. 5, the AC pressure measuring circuit includes a modulated AC voltage output 410, which is coupled directly to the output 272 of the amplifier 260. The modulated AC voltage output is an amplified reproduction of the modulated AC voltage from the center tap 228 of the secondary winding 222 of the transformer 220. As illustrated by a waveform 420, the output of the amplifier comprises a high frequency AC component 422 at the frequency of the original AC voltage 248 generated by AC source 246.

The AC voltage 420 in FIG. 5 is modulated at an intermediate frequency between the high frequency AC excitation signal 248 and the slowly changing amplitude changes caused by changes in capacitance that result from changes in the pressure (Px). The intermediate frequency modulation is generated by changes of capacitance caused by vibration of the body of the CDG 100. When the vibrations are at a frequency substantially different from the resonant (natural) frequency of the diaphragm 130, the modulation effect of the vibrations on the AC voltage is relatively small. As the frequency of the vibrations approach the resonant (natural) frequency of the diaphragm, the effect of the changes in capacitance caused by movement of the diaphragm became greater and may be sufficient to affect the accuracy of the pressure measurements. A modulation envelope 424 in FIG. 5 represents the modulation caused by the vibrations of the diaphragm. The much slower changes in amplitude caused by changes in the pressure (Px) are not shown in the modulation envelope.

In order to determine the effect of the vibrations and to counteract the effect, the modulated AC voltage 420 from the amplifier 260 is applied to an input 432 of a bandpass filter 430 having a frequency centered at the resonant (natural) frequency of the diaphragm 130 and having a bandwidth sufficient to encompass a range of vibration frequencies having amplitude that may affect the accuracy of the AC pressure measurement circuit 250. The resonant frequency and the bandwidth will differ in accordance with the structure of the CDG 100 and are selected based on test measurements for the CDG. For example, the CDG may be positioned on a vibration test platform which vibrates the CDG over a range of frequencies while the output of the amplifier is monitored to determine the natural frequency of the diaphragm in the CDG.

An output 434 of the bandpass filter 430 produces an AC voltage 440 that comprises the signal content (e.g., the modulation components of the high frequency signal) within a frequency range centered about the resonant (natural) frequency of the diaphragm vibrations. In particular, the bandpass filter removes the signal content 422 at the higher carrier frequency of the modulated output signal 420 from the amplifier 260. The bandpass filter also removes the signal content corresponding to the low frequency variations caused by actual pressure variations detected by the sensor. Accordingly, the output of the bandpass filter represents the capacitance changes caused by vibrations at or near the resonant (natural) frequency of the diaphragm.

The AC voltage signal 440 on the output 434 of the bandpass filter is provided to an input 452 of a rectifier 450. An output 454 of the rectifier produces a rectified signal 460. The rectified signal represents the time-varying magnitudes of the vibrations at or near the resonant frequency of the diaphragm.

The time-varying DC voltage on the output 454 of the rectifier 450 is provided to an input 472 of a feedback control circuit 470. An output 474 of the feedback control circuit generates a feedback signal 480. The feedback signal is represented in general as a voltage that adds an average DC value to the normal AC signal only when the diaphragm is moving away from the electrode. The feedback signal is connected to the fixed electrode (or electrodes) 144 within the CDG 100. The feedback signal provides an electrostatic voltage that deflects the diaphragm toward the fixed electrode to oppose the deflection of the diaphragm away from the fixed electrode caused by vibrations. The magnitude of the feedback signal needed to deflect the diaphragm to offset the vibrations is determined when the CDG is originally calibrated to determine the zero point. In particular, when the input pressure (Px) is at the zero point, the CDG sensor is vibrated to determine the resonant frequency. At that time, the magnitude of the feedback signal generated by the feedback control circuit is adjusted to damp the vibration at the resonant frequency. If needed, the center frequency of bandpass filter may also be adjusted during the calibration process to optimize the effectiveness of the feedback signal in damping the vibration. The distortion of the waveform due to the addition of the average value, as described above, is prevented from being seen by the pressure measuring circuit due to the high pass filter (AC coupling capacitor) 252 at the input 254 of the AC pressure measuring circuit 250.

As various changes could be made in the above constructions without departing from the scope of the invention, it is intended that all the matter contained in the above description or shown in the accompanying drawings shall be interpreted as illustrative and not in a limiting sense.

What is claimed is:

1. A method for suppressing the effects of vibration on a capacitance diaphragm gauge (CDG) that generates an output signal having an amplitude that varies in accordance with pressure applied to the CDG, the method comprising:
   processing the output signal to detect changes in amplitude of at least one frequency corresponding to a vibration frequency to generate a feedback signal responsive to the amplitude of the at least one frequency; and
   applying the feedback signal to the diaphragm and the fixed electrode to cause the diaphragm to be deflected counter to the deflection caused by vibration to thereby suppress the deflection caused by vibration.

* * * * *